United States Patent
Jones

[11] 3,853,753
[45] Dec. 10, 1974

[54] REMOVING OIL FROM WASTE WATER WITH SULFUR

[75] Inventor: Loyd W. Jones, Tulsa, Okla.

[73] Assignee: Amoco Production Company, Tulsa, Okla.

[22] Filed: Oct. 13, 1970

[21] Appl. No.: 80,424

[52] U.S. Cl. .................. 210/23, 210/36, 210/40, 210/43, 210/67, 210/DIG. 5, 210/DIG. 21, 252/330
[51] Int. Cl. .................. B01d 17/04, C02b 9/02
[58] Field of Search ............... 210/23, 36, 39–41, 210/42, 49, 55, DIG. 21, 30, 43, 45, 46, 55, 67, 71, 83, 84, 319, 205–208, 502, DIG. 5; 252/328–330, 439; 55/171–177

[56] References Cited
UNITED STATES PATENTS

| | | | |
|---|---|---|---|
| 1,812,629 | 6/1931 | Gifford | 252/330 |
| 1,944,480 | 1/1934 | Van Loenen | 210/502 X |
| 2,102,796 | 12/1937 | Happel et al. | 252/439 X |
| 2,385,527 | 9/1945 | Menefee et al. | 210/28 X |
| 3,405,059 | 10/1968 | Sprow | 210/40 |
| 3,518,183 | 6/1970 | Evans | 210/40 |
| 3,567,660 | 3/1971 | Winkler | 210/40 X |

FOREIGN PATENTS OR APPLICATIONS

| | | | |
|---|---|---|---|
| 3,036 | 2/1900 | Great Britain | 210/40 |

*Primary Examiner*—Thomas G. Wyse
*Attorney, Agent, or Firm*—John D. Gassett; Paul F. Hawley

[57] ABSTRACT

This invention relates to water pollution control and concerns a system for removing dispersed oil from water by contacting the oily water with sulfur to cause the oil to coalesce or agglomerate. In a preferred embodiment, the water containing the dispersed oil is passed through a bed of granular media presenting a surface area of solid phase sulfur to coalesce the dispersed oil. The coalesced oil is then separated from the water.

13 Claims, 6 Drawing Figures

INVENTOR.
LOYD W. JONES

REMOVING OIL FROM WASTE WATER WITH SULFUR

BACKGROUND OF THE INVENTION

1. Field of the Invention

This invention relates to a method of removing dispersed oil from oily water by contacting the oily water with sulfur to cause the oil to coalesce or agglomerate. It particularly concerns the method in which the water containing the dispersed oil is passed through a bed of granular solid phase yellow sulfur to coalesce the dispersed oil. It also concerns a system in which a slurry of yellow sulfur is mixed with the oily water to cause the oil to coagulate with the sulfur slurry.

2. Setting of the Invention

In recent years the Government and public have become increasingly aware of the need to eliminate pollution of our atmosphere and our water. Industry is moving to minimize these pollution problems both due to a sense of public obligations and to meet legal requirements. Although many of our larger industrial sites are experiencing air pollution problems, it is believed that as a nation the elimination of the pollution from our water systems is more urgent.

Many water pollution problems are recognized, but the solution is not always readily apparent. A particularly troublesome area is the pollution of water by floating and dispersed oil. This problem is nearly always present around oil refineries and oil producing facilities. Of course, there are known ways of removing essentially all oil from such oily water. However, such known means are either too expensive or not adaptable to such large scale operations. Some removal systems also produce large amounts of oily sludge that cannot be easily disposed of.

Many of the oil field waters contain up to about 100 to 500 ppm of water. This should be reduced to essentially zero ppm of oil if the water is to be dumped into our surface streams. If this water is to be injected into an underground reservoir to aid in driving out the oil, as is common in secondary recovery operations, the oil content should be less than about 10 ppm. An economical way of removing this dispersed oil from such water would be a big help in reducing this phase of water pollution. The invention described herein provides such a system.

BRIEF SUMMARY OF THE INVENTION

This concerns a method of removing dispersed oil from water by contacting the oily water with sulfur to cause the oil to coalesce or agglomerate. In a preferred embodiment, the water containing the dispersed oil is flowed through a bed of granular media of granular sulfur or sulfur coated sand, which presents a surface area of solid phase sulfur to coalesce the dispersed oil. The coalesced oil is then separated from the water. In another embodiment, a sulfur slurry is mixed with the oily water to cause the oil to coagulate with the sulfur. A separator, such as a cyclone separator, separates the coagulate from the water.

BRIEF DESCRIPTION OF THE DRAWINGS

A better understanding of the invention and various modifications and objects thereof can be made with the following description taken in conjunction with the drawings.

DETAILED DESCRIPTION OF THE INVENTION

Figures 1, 2:
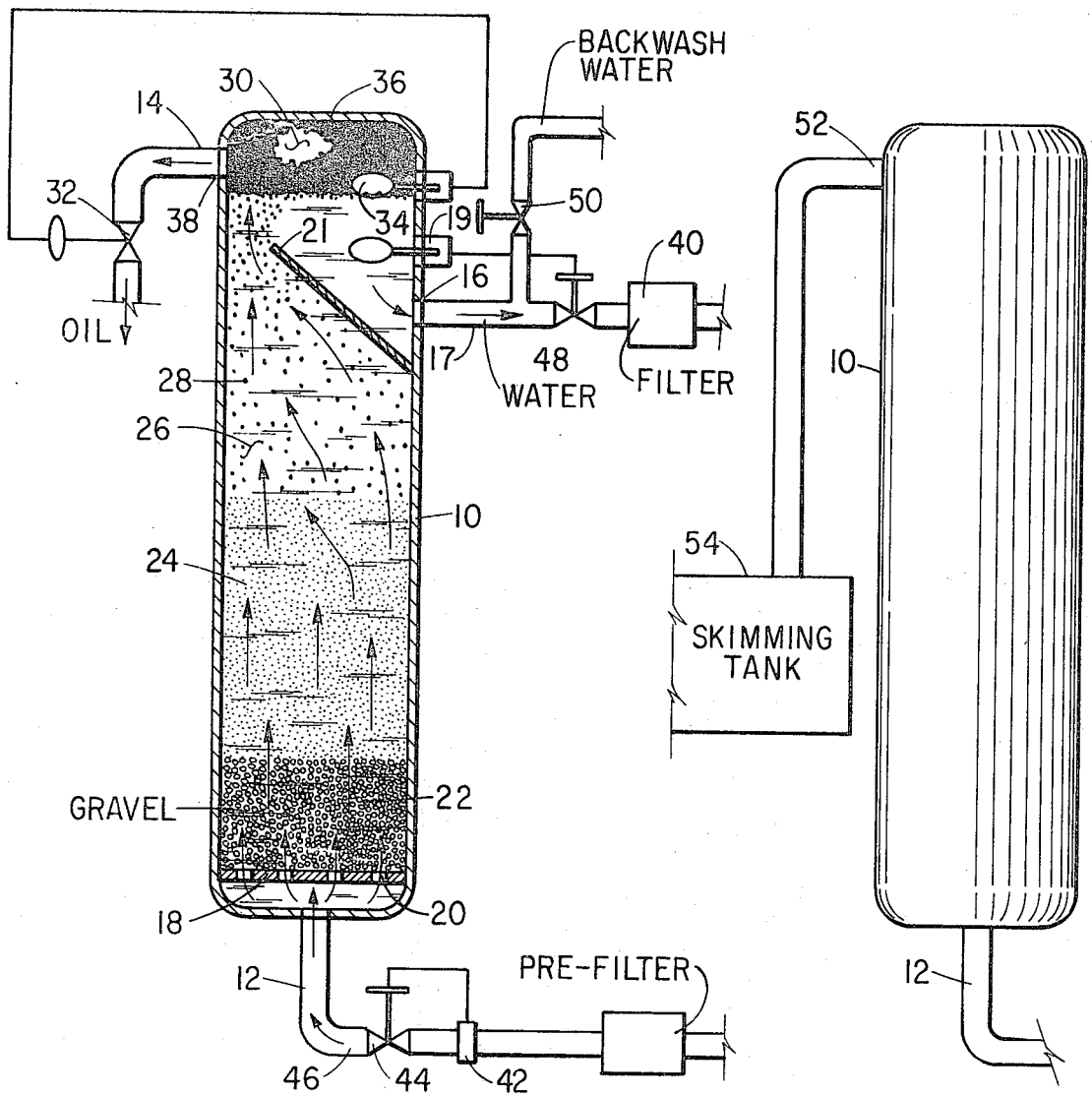
FIG. 1 is a vertical schematic drawing showing a system in accordance with this invention for removing dispersed oil from water by coalescence.
FIG. 2 illustrates a modification of the system of FIG. 1.

The idea of an oil removal filter or coalescer is attractive as a simple means of concentrating dispersed oil so that it can be readily removed from the water. FIG. 1 illustrates one such coalescing system for removing dispersed oil from water. Shown in FIG. 1 is an upright cylindrical vessel 10 which has a lower oily water inlet 12, an oil outlet 14 at the top thereof and a water outlet 16 spaced below the oil outlet. A fluid distribution plate 18 having holes 20 is located at the lower end of vessel 10. Its purpose, of course, is to give lateral distribution to the incoming oily fluid. Connected to inlet 12 is feed conduit 46 which has flow control valve 44 controlled by a meter 42 in a known manner so that a selected rate of oily water can be passed through the filter assembly.

Immediately on top of distribution plate 18 is a gravel bed 22. On top of bed 22 is a granular sulfur-oil coalescing medium 24. If desired, a screen can be placed on top of bed 24 to assist in holding bed 24 in place. The gravel layer is designed to support the overlying layer of sulfur media and to uniformly distribute the oily water into the sulfur media. The size of the gravel is larger than the sulfur media particles and can typically be in the range of about 6 to about 20 mm. Typically, the gravel bed 22 could be about 1 to 2 feet thick. The thickness is merely sufficient to aid in uniform distribution of water and to support the sulfur media above the water distribution plate. In fact, the gravel is not absolutely essential and the sulfur media can rest directly on the distribution plate, perforated pipes, nozzles or other inlet water distribution systems.

On top of gravel bed 22 is the granular oil coalescing medium 24. I have discovered that the surface of sulfur is highly efficient as an oil collector. The surface of yellow sulfur is many times, at least three, more efficient in this respect than other forms of sulfur such as white sulfur, for example. Yellow sulfur is also many times, at least three, more efficient than other substances such as carbon and straw. The oil-sulfur contact angle of yellow sulfur is apparently very low for most unrefined oils and the adhesive force strong. Visual observations indicate that an oil film on sulfur can increase to a surprising thickness in the presence of flowing oily water such as water containing as little oil as 1 ppm. In contact with sulfur, the oil film appears to be abnormally cohesive. While I do not know for sure, it is believed that traces of sulfur are dissolved into the oil and induces increased oil-to-oil cohesiveness; possibly by reduced repulsive polar forces at unsaturated bonds in the hydrocarbon molecules. Because of this finding, I construct bed 24 to have a surface area of solid phase yellow sulfur to coalesce the dispersed oil. A particularly desirable way of constructing granular bed 24 is to coat substantially spherical sand grains with yellow sulfur. I generally prefer that the sand grains have diameters from 0.5 to 8 mm. and preferably about 2 to 4 mm. This coating of sulfur onto the sand gives the sulfur bed 24 greater mechanical strength than that of grains of sulfur alone. The sulfur coating can be easily obtained by many methods. For example, the sand and molten sulfur can be mixed and then allowed to solidify. The coated sand can then be broken up and rescreened to size. For example, pulverized sulfur and 1 to 8 mm. sand particles (in a weight ratio of about 10–15% sulfur and 90–85% sand) are mechanically mixed while heating. When the sulfur liquefies at about 240°F it coats over the sand grains. At this point the mixture is allowed to cool. The cooled mass is then mechanically broken to separate the coated sand grains. Breaking and rescreening can be avoided by stirring the mass rapidly as it cools. Sulfur fines created by attrition and any small amount of unbroken clumps are then screened out. The final product should contain about 8–12% sulfur by weight, however, 5% will work. The sulfur coating has an average thickness of about 0.1 to 3 mm.

Figure 3:
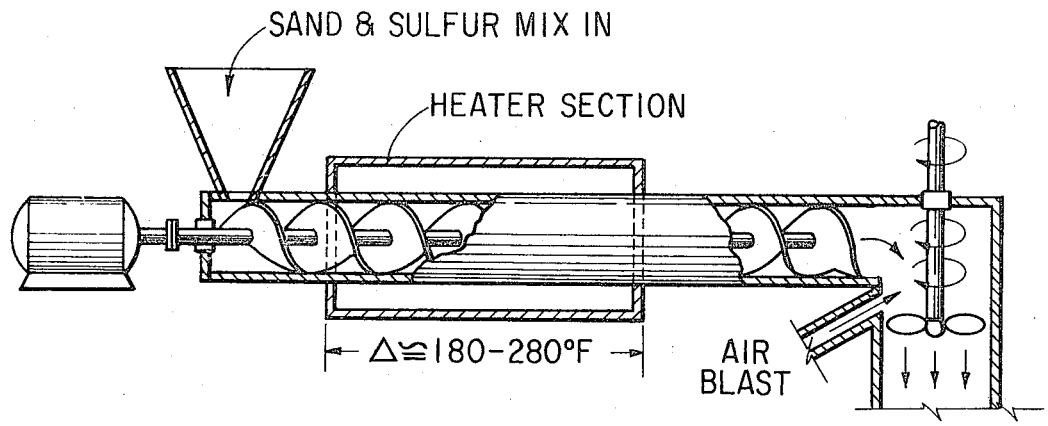
FIG. 3 illustrates a system for coating sand or other granular media with sulfur.

FIG. 3 illustrates an embodiment of an apparatus specifically for the purpose of coating sand grains with sulfur. Shown thereon is hopper 60 which feeds into one end of horizontal housing 62. A screw-conveyor driven by motor 66 is in housing 62. A heating section 68 surrounds a large portion of housing 62. Sand and sulfur are placed in hopper 60 and conveyed through the heating section. This heating section should be of sufficient length and temperature so that as the sulfur passes through the heating section it becomes melted so that it coats the tumbling sand grains.

A deflector shell 74 with a downwardly facing outlet is connected to the downstream end of housing 62. The conveyor section on housing section 62 downstream of the heater section 68 is long enough to permit cooling of the sulfur. This section may be surrounded by a cooling coil, if desired. As the mixture is kept moving as the sulfur starts to solidify, the sulfur-sand mass will not tend to cement into a hard solid. However, it is preferred to have some means of rapidly cooling the sulfur as it starts to solidify. Such means are shown in FIG. 3. An air-blast is injected through inlet 70 into outlet deflector shell 74. This air-blast both cools and tends to break up the friable mix. As a further aid in breaking up the mix of sulfur and sand, a vane-type beater 72 is provided in shell 74. This mechanically shatters the small clumps that may form as the mix is cooled in the air-blast region. It should be noted that if the air-blast 70 is used that there is no need for a long extension of the conveyor section of housing 62 downstream of the heater section 68 as the air-blast will effect the desired cooling. However, the sulfur coated sand mass should be at a temperature generally less than 200°F to avoid possible ignition of the sulfur by the time the air-blast contacts it. Laboratory tests indicate that the heater 68 should heat the sulfur-sand mix to about 270°F ±20°. These tests further indicate that the weight ratio of sulfur to sand fed into hopper 60 should be about 1:9, however, ratios of 1:5 to 1:20 will produce usable material.

Reference is now made back to FIG. 1. Above granular sulfur bed 24 is a vertical space 26 through which the water and globules of coalesced oil flow. A sloping baffle 15 is provided and extends about two-thirds or so across vessel 10 to leave an opening for the coalesced oil and water to flow. The baffle is welded to the inside of vessel 10, with its lower edge below water outlet 16 and its top edge terminates about water inlet 16, but below oil outlet 14. Baffle clearance above the bed should typically be about ½ to 3 feet. As oily water flows up through coalescing media 24, the dispersed oil in the water is caused to form into large drops, typically about ¼ inch in diameter. These droplets are indicated as item 28 and in this large mass, relatively speaking, the oil passes rapidly, somewhat like bubbles, to the top of container 10 where they accumulate as an oil concentration 30. The accumulated oil can then be drained off through outlet 14. This outlet can contain a valve control means 32 which controls the flow of fluid out outlet 14. This can be controlled by a float means 34 which floats on the oil-water interface 36. The purpose of this is to keep the oil-water interface 36 below the lower periphery of outlet 38 of outlet 14. This permits only oil to leave through outlet 14. Water outlet 16 is connected through pipe 17 to a filter 40, if desired, for filtering purposes. Pipe 17 has valve 48 which can be controlled by a water level indicator 19 so that if the top interface of the water drops below a certain level, valve 48 is closed. This prevents oil from flowing out water outlet 16. The water from outlet 16 is essentially free from any dispersed oil.

It is desirable to control the upward flow of water through bed 24. This rate can be easily controlled by use of a flowmeter 42 and a control valve 44 in line 46 leading to inlet 12. When sulfur coated sand is used, the flow rate should generally be controlled so that the velocity through the cross-section of bed 29 does not exceed about 20 gal./min./sq.ft. of a corss-section of bed 24. Low flow rates, e.g., <5 gal./min./sq.ft., are not harmful but unduly reduce the throughput capacity of the unit. However, the flow rate should be below that which fluidizes the bed. Typically, the oil should flow up through the bed at a rate in the range of about 10 gallons per minute per square foot of cross-sectional area of the bed 24. This rate has been found to coalesce most of the oil flowing in the oily water. For any particular clean-up operation, the most efficient rate should be determined experimentally by analysis for dispersed oil remaining in the water flowing through outlet 16 at different flow rates.

The grain size of the granular media in bed 24 can be varied. In general, the smaller the grain size (to obtain maximum surface area) the better the coalescing effect. However, if the grain size is too small the bed may tend to become clogged with fine solids and heavy hydrocarbons. The general range of practical size is from about 0.5 to 4.0 mm. If the sand is made in the preferred range, which is 2–4 mm., then bed 24 should seldom become plugged with solids in most field operations. This is true because fine solids pass upwardly through the bed and, thus, do not clog it. Oil wet fine solids tend to float out with the oil. An analysis of the solids in the oily water to be treated gives an indication as to the desired size of grains in bed 24 and the need for a coarse pre-filter. By proper selecting of the size of the grain, the bed seldom needs to be backwashed. However, if large debris and irreversibly trapped heavy hydrocarbon accumulate after a period of time, the bed 24 and gravel pack 22 can be cleaned by rapid backwashing. This can be readily accomplished by closing valve 48 and opening valve 50; this latter valve 50 is connected to a backwash water source not shown. Valve 32 in the oil outlet could also be closed and the outlet 12 opened to a pit or other water-holding means. The water is forced through beds 24 and 22 at a sufficiently high rate to clean the debris from each. Rapid upflow washing can be accomplished by increasing the flow rate to about 30 gal./min./sq.ft. to expand bed 24.

A pre-filter 41 can be placed in the input oily water line 46 to remove large (e.g., $>30\mu$) oil wet solids. A post-filter 40 can be connected to clean water outlet 16 to remove fine water wet solids.

Based on the model studies I have made, the use of yellow sulfur coated sand (or the like) as an oil coalescing medium is the generally preferred mode of operation. In one test series, for example, water containing dispersed ($40\mu$ and smaller) oil at a concentration of 200 ppm was fed into the bottom of a packed column at an upflow velocity equivalent to 20 gal./min./sq.ft. of cross-sectional area of the yellow sulfur bed. The packing media of the packed column was 0.8 to 2.0 mm. sand, coated with sulfur. Thickness of the sulfur coat averaged about 0.1 mm. The column initially retained the equivalent of about 0.4 gal. of oil/ft.$^3$ of media before oil breakthrough. In a similar test a commercial heat treated anthracite filter media retained only 0.1 gal./ft.$^3$. After breakthrough, oil in the anthracite filter media column effluent remained finely dispersed ($40\mu$ and less). Oil in the effluent from the sulfur coated sand column was large drops of about ¼ diameter which floated to the top of the effluent water and was easily collected and drained off.

A similar test was made using 2-4 mm. uncoated sand mixed (mechanically) with 10% by wt. of 1-2 mm. powdered sulfur. This coalesced an estimated 30-40% of the oil to ⅛-¼ inch droplets, but about 20% bypassed through in the original finely dispersed state. This shows that there was not enough sulfur surface available.

In FIG. 1, I show the oil being removed from the top of vessel 10 and the water from the lower point 16. However, this can be modified as shown in FIG. 2. The interior of vessel 10 can be the same in each embodiment except that baffle plate 15 is not needed in the embodiment of FIG. 2. In FIG. 2 there is only one outlet of the vessel and that is outlet 52 at the top. There, the oil and water are both passed to a skimming tank 54 where the oil is skimmed from the water. This skimming process is now possible because by passing the oily water through my coalescing medium, the oil has accumulated into large droplets, e.g., ¼ inch in diameter or larger, and oil in this size droplet is easily removed by mechanical skimming processes. The direction of flow of oily water through my coalescing bed 24 is not critical.

While all of my testing has been done in oily water at room temperature of 70°-80°F, it is believed that the system would work and at essentially any temperature between the freezing point and the boiling point of the water.

Figure 5:
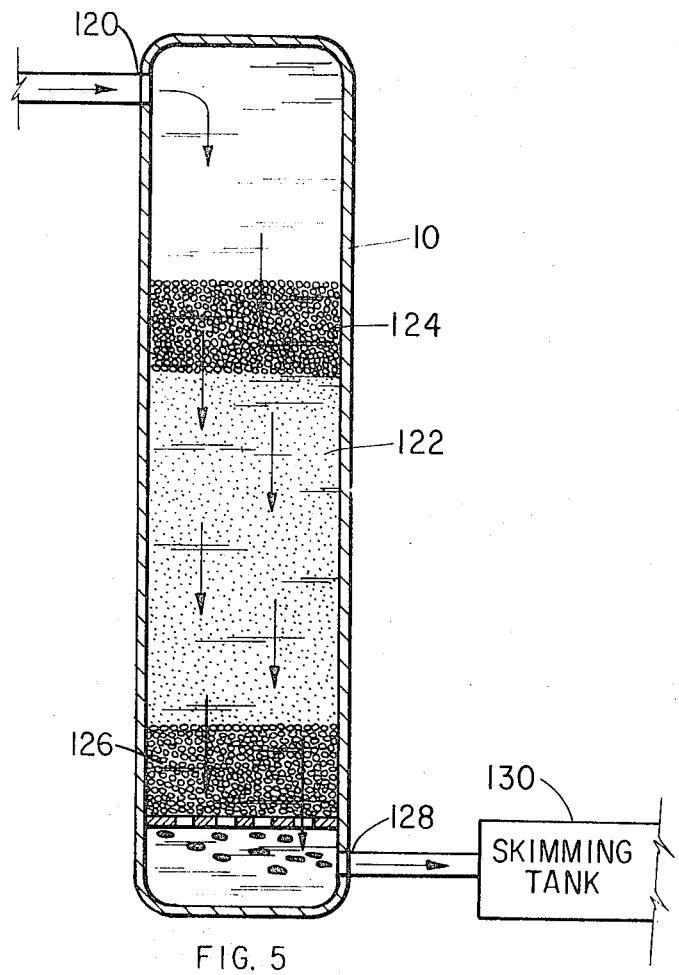
FIG. 5 illustrates an embodiment featuring a downflow system for removing oil from water.

Attention is directed to FIG. 5 which shows a particularly attractive modification of the invention for downflow of the oily water through the sulfur bed to coalesce the dispersed oil. Shown in FIG. 5 is vessel 10 having an oily water inlet 120 at the top and an outlet 128 at the bottom, which is connected to a skimming tank 130. A coalescing bed 122 is provided in vessel 10 and is similar to bed 24 as described above in connection with FIG. 1. It is preferred that the size grain of this bed be 1-4 mm. Bed 122 rests on support medium 126 which functions similarly to and can be the same as gravel bed 22 of FIG. 1. Placed directly on top of bed 122 is another bed 124 which has a preferred particle size of 4-8 mm. These particles in bed 124 can be relatively large particles of yellow sulfur or sulfur coated sand. It can be coal or other low-density particles, but it is preferred to be sulfur to aid in the coalescing effect. In this operation, oily water is injected through input 120 and is distributed laterally by the top, coarse bed 124. As the oily water flows downwardly through bed 122, the oil particles are coalesced in the same manner as described above where the upflow of bed 22 is through bed 24. The water and large oil droplets are conveyed through outlet 128 to a skimming tank 130 or other oil-water separating devices. As the dispersed oil is now coalesced, it is easily removed in the skimming tank.

The mechanical arrangement illustrated by FIG. 5 allows still another, although not the preferred, modification of my invention. If the oily water to be treated contains relatively small amounts (e.g., <100 ppm) of oil but also contains more than about 10 ppm of suspended solid particles, it may be desirable to trap both the oil and the solids simultaneously in the same vessel. This can be accomplished by making the upper bed 124 sulfur or sulfur coated sand (1-4 mm. size) and intermediate bed 122 is sand of about 0.5 mm. size, either coated or uncoated with sulfur. Downflow operation is continued until upper bed 124 is saturated with oil or intermediate bed 122 is clogged with filtered-out solids. In this modification, I stop the flow of oily-water before the bed 124 is saturated, so that no oil is released from bed 124. This saturation point can be determined by observation and experiment. At this point, the total bed is backwashed in an upflow direction at a velocity (usually $>15$ gal./min./sq.ft.) sufficient to expand both beds 122 and 124 and release trapped solids and oil. The solids laden backwash water and coalesced oil are routed upward through outlet 128 to a separation vessel which can be skimming tank 130.

Figure 4:
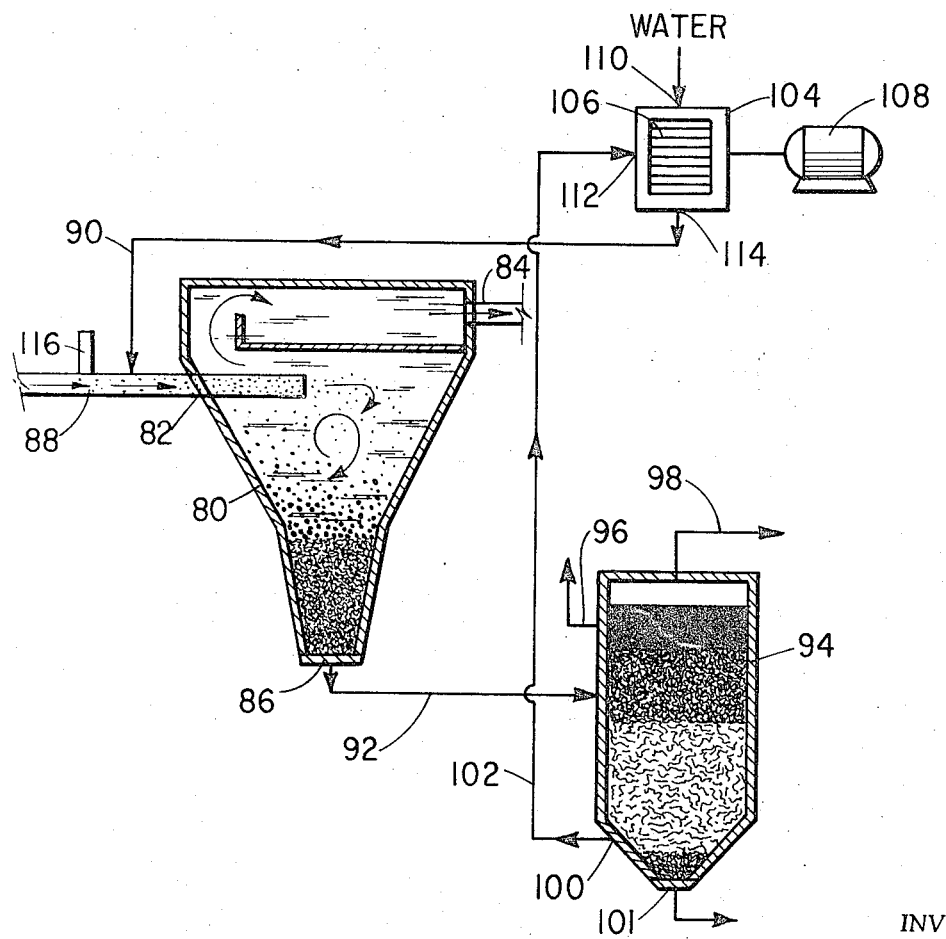
FIG. 4 illustrates a schematic drawing of another embodiment of this invention in which finely divided sulfur is mixed with oily water to cause the oil to agglomerate.

Attention is now directed to FIG. 4 for another embodiment for use in contacting oily water with sulfur in the solid phase. This illustrates a system or means of first mixing the oily water with solid phase yellow sulfur so that the dispersed oil coagulates or agglomerates. Also shown are means for separating the oil-free water from a sulfur-oil sludge, and then means are shown for recovering the sulfur from a sulfur-oil sludge so that it can again be used. Shown is cyclone separator 80 having inlet 82, top outlet 84 and bottom outlet 86. Separator 80 can be any other commercially available separator, such as a rotary vacuum filter. Oily water is conveyed, from a source not shown, through pipe 88 to inlet 82. A sulfur slurry is conducted through pipe 90 and is connected into line 88 so that both the oily water and the sulfur slurry are mixed and injected tangentially into separator 80. The amount of sulfur should generally be about 3 times or more the weight of oil to be removed. The separator 80, as shown, is a low-velocity cyclone type which centrifugally separates the oil-sulfur agglomerate from the water. It is designed such that for the rate of injection of oily water and sulfur slurry a vortex will tend to form, but the flow velocity is not great enough to emulsify the oil-sulfur-water mixture. The optimum flow velocity varies widely with varying amounts and types of oil in the water. When the slurry of finely divided yellow sulfur in water is introduced into the oily waste water stream, the sulfur particles occlude and agglomerate the dispersed oil into a mixture heavier than water.

In the apparatus of FIG. 4, clean water is taken off the top of the cyclone separator 80 at outlet 84. The heavier sulfur-oil sludge is withdrawn from outlet 86. Means will now be discussed for separating the sulfur and the oil from each other. The outlet from 86 is fed through a pipe 92 to a heating separator 94. The sulfur-oil sludge is fed into the middle portion of this separator which can be merely a vertical tank with heating coils on the outside. The mixture is heated to just above the melting point of sulfur, which is about 240°F. The oil being lighter than the sludge floats to the top and is removed through a side outlet 96. This oil can be used for many purposes such as for burning to supply heat for the separator 94. At the very top of separator 94 is a vent 98, which is a vent for water and light hydrocarbon vapor, inasmuch as there will probably be some small amount of water in the sulfur-oil sludge taken from the bottom of cyclone separator 80. Molten sulfur is removed from near the bottom of separator 94 through outlet 100 and is conducted through insulated pipeline 102 to be re-used in making a sulfur slurry for, again, separating the dispersed oil from the oily water in a continuous process. A bottom drain 101 is provided for removing sludge, etc. Pipe 102 is connected to a high shear mixture tank 104 which has a mixing blade means 106, rotatable by motor 108. Clean water from a source not shown is injected through top inlet 110. The molten sulfur is simultaneously injected through side inlet 112. The amount of water injected is sufficient to quickly quench the sulfur and produce a slurry of solid yellow sulfur particles. This sulfur slurry is then taken from mixture 104 through bottom outlet 114, which is connected to line or pipe 90. The sulfur slurry formed by the recovered sulfur is injected into the oily water line 88. It can be seen then that this is a continuous process that yields oil-free water and relatively clean liquid oil. Unlike other oil-adsorbing media (such as clays) the adsorbing or occluding media (sulfur) used in my process is recovered and reused. This solves a serious problem of having to dispose of oily sludge.

Another possible modification of the device of FIG. 4 is the adding of oil wetting surfactants through pipe 116 to oily water inlet pipe 88. This is done to enhance the removal of solid suspended matter. The basis for this is done to enhance the removal of solid suspended matter. The basis for this modification is that the coalescence of the sulfur and oil forms a coherent fluid precipitate which can carry down oil wetted solid particles. Thus, the addition of the oil wetting surfactants enhances the removal of the solid suspended matter.

Several experiments have been conducted in the laboratory to show the operability of this embodiment shown in FIG. 4. For example, in one experiment, 4 ml. of crude oil was dispersed by stirring into 200 ml. of water. Approximately 12 grams of powdered yellow sulfur was sprinkled into the oilwater dispersion while continuing agitation of the mixture. Stirring speed was reduced and a coherent fluid mass of coagulated oil and sulfur settled rapidly to the bottom of the beaker, leaving the supernatant water clear. The oil-sulfur precipitate was separated from the water and heated to about 250°F. Oil floated to the top and molten sulfur settled to the bottom and each phase could be drawn off as a liquid.

I found that vaporization and condensation of sulfur into water tends to form white sulfur, which I have found has a much lower affinity for oil than does yellow sulfur. Thus, separator 94 should not be heated sufficiently to vaporize the sulfur; it should merely melt the sulfur to a thin liquid. The sulfur should not be heated above 320°F. since the viscosity increases above this temperature. In one of many other experiments, 6.8 grams of molten (258°F) yellow sulfur was added to 200 ml. of water in a Waring blender to form a dispersion or slurry of yellow sulfur in water. The dispersion was transferred to a beaker and stirred (with magnet stirrer) at a rate rapid enough to form a vortex, but not fast enough to emulsify crude oil into the water. Crude oil was added to the stirring slurry of sulfur in water. Approximately 4.5 ml. of oil was taken up by the sulfur and the oil-sulfur mass settled to the bottom, leaving the water clear and clean. (Note: The sulfur/oil ratio was 1.5 g./ml. or about 2:1 by weight; but for some oil a ratio as low as 1:1 could work.) With gentle stirring, the bottom mass stayed coherent with no oil release. This indicated that the mass could be drawn off the bottom of a low velocity clarifier or cyclone-type vessel, as discussed above. If allowed to stand quiescent, some of the light crude oil separated from the mass and floated to the top. In a similar experiment, but with a higher ratio of sulfur (3 g./ml. of oil), no oil release occurred.

Figure 6:
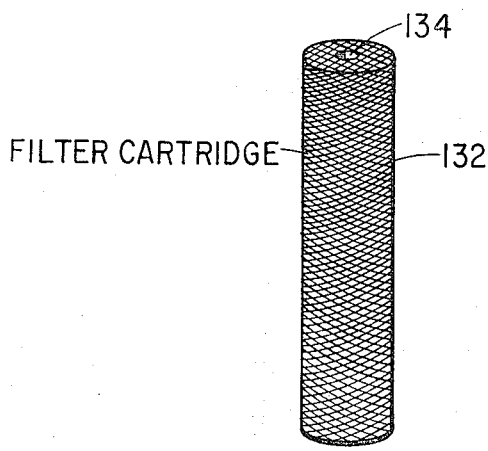
FIG. 6 illustrates a sulfur containing disposable-type filter cartridge.

Disposable cartridge-type oil coalescing and trapping filters can be made utilizing the principle which I have discovered. Attention is directed to FIG. 5 which shows such a cartridge. This cartridge is made by tightly winding or molding coarse threads or fibrous material, such as wool, cotton linters or plastic strands, about a permeable hollow core to form the cartridge. The coarse material 132 is coated with molten sulfur and then wrapped or molded into the form shown in FIG. 6 to leave an open core 134. Upon subsequent cooling and solidification, the sulfur acts as a binder for the fibrous material. Alternately, the fibrous material can be prewound or molded onto the core and then infused with a slurry of fine sulfur particles, which are trapped within the interstices of the fiber. The amount of sulfur used to coat the fibers or partially fill the interstices is selected to allow the final wall of the cartridge to retain some permeability. The openings or flow paths through the final matrix, which constitutes the wall of the cylindrical cartridge, may vary widely depending on whether or not the cartridge is to be used to (1) trap both fine solids and coalesced oil or to (2) simply coalesce oil for subsequent separation. For the second case, the average opening diameter may be 100 to 1,000$\mu$. The openings may also be graded in size from large at the outer wall to small at the inner wall. Further, it is not necessary to have sulfur deposited completely through the wall thickness. Only the outer one-half of the wall may contain sulfur deposited onto or between the strands of the fibrous material. This arrangement is particularly desirable when the cartridge is fabricated with large openings in the outer portion of the wall and the openings are graded down to a smaller size toward the inner wall of the cylinder. Oil in water entering the outer wall is coalesced on contact with the sulfur and becomes trapped in the interstices of the fibers.

A typical thickness of the cartridge wall could be about 1. These cartridges can be inserted in any water clean-up housing which forces the oily water through the cartridge. When this filter becomes filled or partially clogged with coalesced oil or solids, it is replaced with a new one. Otherwise, the coalesced oil in the filter may be released and pass through the filter, as a given filter has only a certain amount of oil-retaining capacity.

While the above invention has been described with considerable detail, it is possible to make many modifications thereof without departing from the spirit or the scope of the invention.

I claim:

1. A method of removing dispersed oil from oily water which comprises:
   contacting elemental sulfur in the solid phase with said oily water to agglomerate the oil; and
   separating the agglomerated oil from the water.

2. A method as defined in claim 1 in which the sulfur is coated on sand which is arranged to form a bed of granular media, such sand having grain size of between about 0.5 to 8mm in diameter and in which the step of contacting sulfur in the solid phase includes flowing said oily water through said bed.

3. A method as defined in claim 2 in which the oily water is flowed through said bed of granular media at a velocity of not over 20 gallons/minutes/square foot of cross sectional area of said bed.

4. A method as defined in claim 1 in which the sulfur covering the sand has an average thickness of about 0.1 to about 3mm.

5. A method as defined in claim 1 in which the sulfur is arranged in a granular bed and in which said oily water is flowed through the granular bed at a flow rate below the velocity required to fluidize said bed.

6. A method of removing dispersed oil from oily water which comprises:
   mixing yellow sulfur particles with said oily water to cause the oil to coagulate with the sulfur particles;
   separating the water from said coagulated sulfur-oil.

7. A method as defined in claim 6 including the steps of passing said coagulated sulfur-oil through a heated separator;
   removing oil from the upper part of said separator and molten sulfur from the lower part.

8. A method as defined in claim 7 including making a sulfur slurry from said molten sulfur and mixing said sulfur slurry with said water.

9. A method as defined in claim 6 in which the ratio of sulfur to oil is at least about one part by weight of sulfur to one part by weight of oil.

10. A method as defined in claim 6 in which the sulfur-oil ratio by weight is about three to one.

11. A method of removing dispersed oil from oily water which comprises:
    flowing the oily water into a container;
    simultaneously adding sulfur particles to said container while agitating the oily water to form an oil-sulfur precipitate;
    removing water from the upper portion of said container;
    removing sulfur-oil precipitate from the lower portion of said container.

12. A method as defined in claim 11 including the steps of separating said sulfur and said oil from said sulfur-oil precipitate and returning the recovered sulfur to said container to again form a precipitate with the oil in said oily water.

13. A method of removing oil from water which comprises contacting said oil with a solid material consisting of elemental sulfur.

* * * * *

PO-1050
(5/69)

UNITED STATES PATENT OFFICE
CERTIFICATE OF CORRECTION

Patent No. 3,853,753      Dated December 10, 1974

Inventor(s) Loyd W. Jones

It is certified that error appears in the above-identified patent and that said Letters Patent are hereby corrected as shown below:

In the specification:

Column 7, beginning line 55, after "matter.", delete the sentence "The basis for this is done to enhance the removal of solid suspended matter."

Column 8, line 59, after "separation.", insert the sentence--For the first case, the openings may have an average diameter of 5 to 100µ.--

Signed and sealed this 4th day of March 1975.

(SEAL)
Attest:

RUTH C. MASON
Attesting Officer

C. MARSHALL DANN
Commissioner of Patents
and Trademarks